Patented Apr. 29, 1952

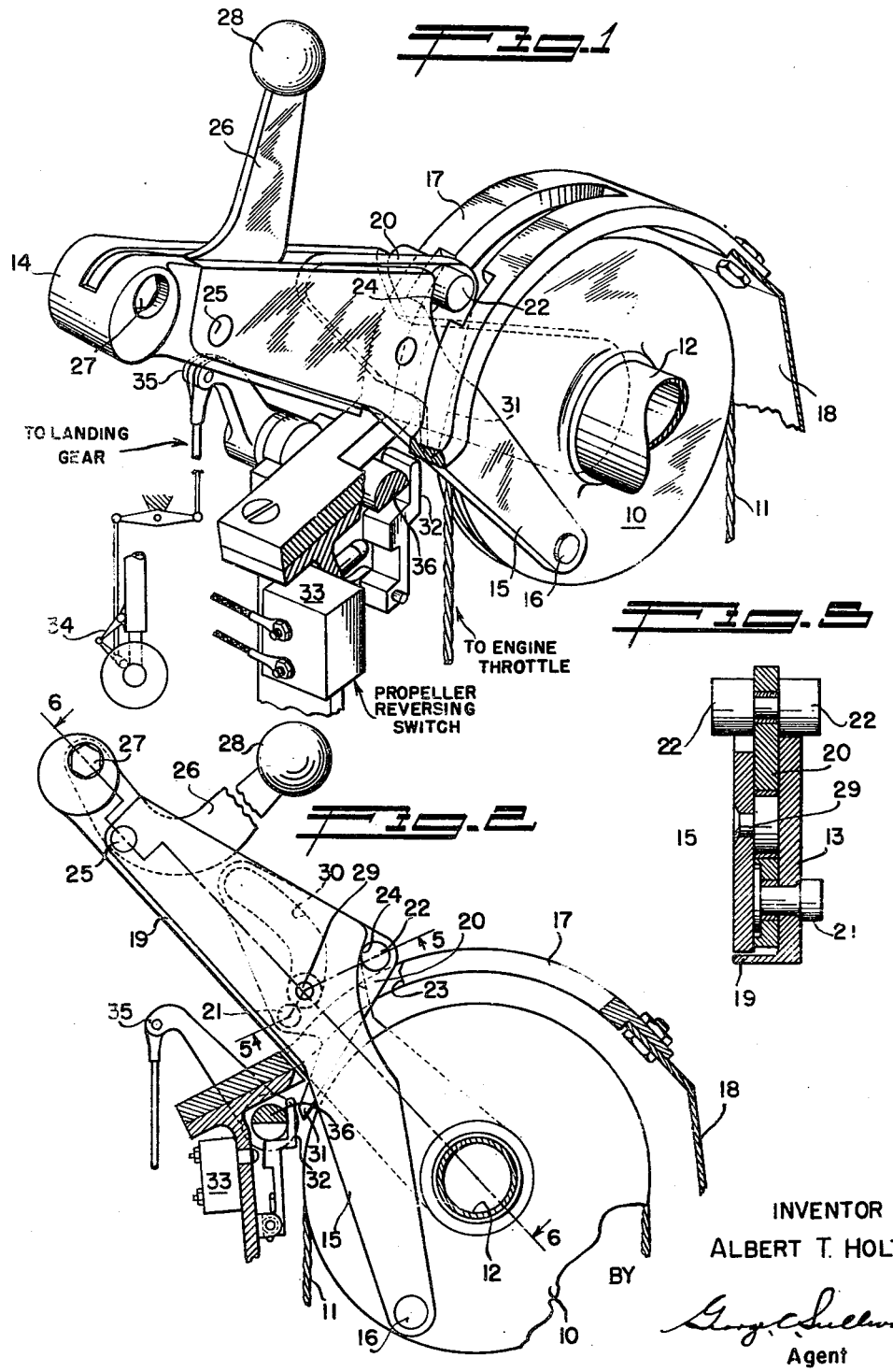

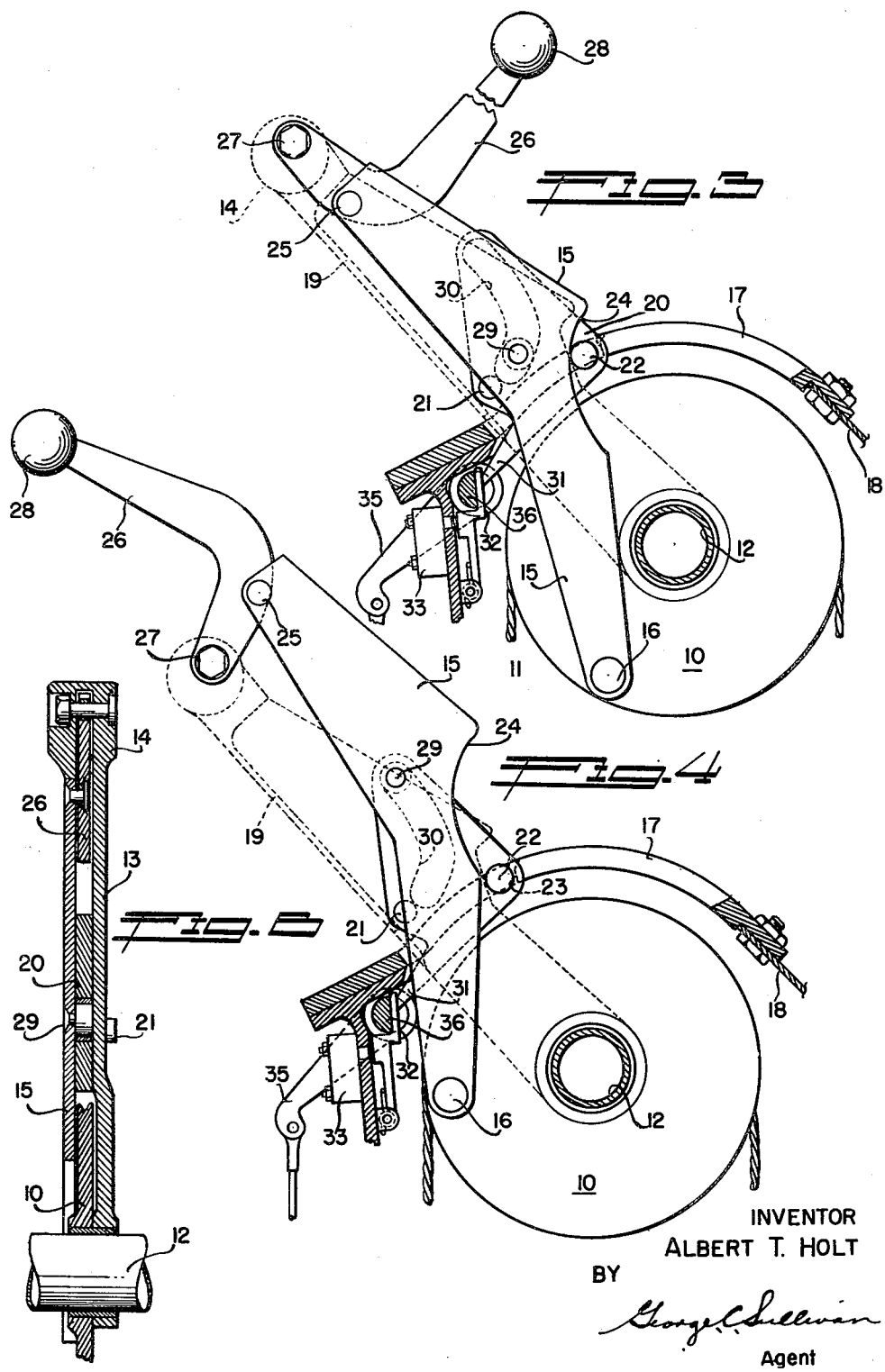

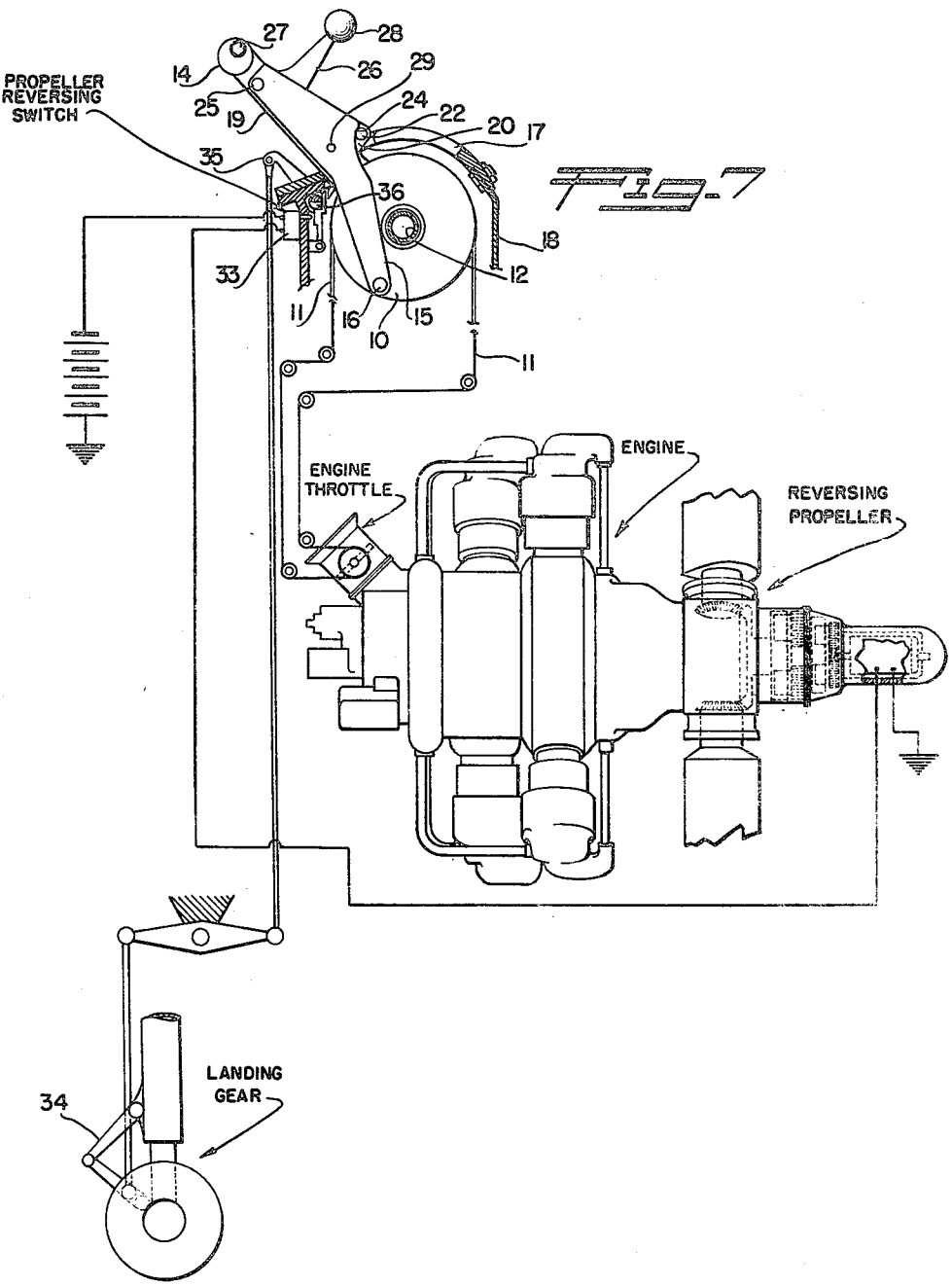

2,594,927

UNITED STATES PATENT OFFICE 2,594,927

PROPELLER REVERSING THROTTLE

Albert T. Holt, Burbank, Calif., assignor to Lockheed Aircraft Corporation, Burbank, Calif.

Application June 2, 1947, Serial No. 751,927

14 Claims. (Cl. 244—81)

1

This invention relates to an improved throttle control for aircraft power plants equipped with reversible propellers.

The use of adjustable or controllable pitch propellers for aircraft can be desirably extended to reverse the thrust thereof for maneuvering and aerodynamic braking. Such use of reverse pitch propellers must be limited to use on the ground or water, since to reverse the propeller while airborne would have disastrous effects on heavier than air types of aircraft dependent upon forward speed to be airborne. It is accordingly an important object of this invention to prevent the actuation of the propeller reversing mechanism while airborne, and to render such mechanism operable at will upon ground or water contact.

Pitch adjusting, feathering, and reversing propellers of the types intended to be controlled by the throttle of this invention cannot be changed over from forward to reverse at substantial engine powers without serious danger of overspeeding and "throwing" the blades as they turn through the neutral pitch point and hence unload the engine. It is accordingly necessary to reduce the engine speed to idling before energizing the propeller reversing mechanism, which mechanism itself is not instantaneous in operation. A further feature of my invention therefore involves the mandatory return of the normal throttle to its idling position before the propeller reversing mechanism can be actuated, and thereafter provides for a gradual acceleration of the engine as the propeller blade angles approach the full reverse position and thereby progressively impose increasing loads on the engine.

It is also an object of this invention to provide an improved reverse sensing throttle control of the type described wherein the reversing motion is accomplished by a separate and distinct lever associated with the normal throttle, and requiring a distinctively different pilot actuation motion whereby to preclude inadvertent or accidental operation of the reversing mechanism, thereby permitting operation by touch without distracting the pilot's attention from other critical landing procedures.

It is a further object of this invention to provide a reverse sensing throttle of the type described which is operable by the pilot without the preliminary or coordinated release or actuation of any other mechanism.

It is still another object of this invention to provide a throttle of the type described that will be simple and compact and adapted for gang or parallel mounting in the case of multi-engine airplanes, whereby the pilot is enabled to selectively operate any one or more of the forward and reverse throttles, thus permitting the use of a forward throttle on a power plant on one side of the airplane and a reverse throttle for a power plant on the other side, an arrangement especially convenient for maneuvering seaplanes and flying boats while on the water.

Other objects and features of the invention will be readily understood from the following detailed description of a typical preferred form of the invention wherein reference will be made to the accompanying drawings in which:

Figure 1 is a perspective view of a throttle embodying the features of my invention including a reverse sensing throttle and a propeller reversing control;

Figure 2 is a side view of the throttle control mechanism of this invention with surrounding structure broken away, shown in the engine idling position;

Figure 3 is a view similar to Figure 2 wherein the reversing control mechanism has been advanced to a point initiating the reversing control of the propeller;

Figure 4 is a view similar to Figures 2 and 3 showing the reversing control mechanism advanced to the position of maximum engine power or throttle permissible in reversed pitch;

Figure 5 is a slightly enlarged section on the line 5—5 of Figure 2 showing a cross-section of the forward, reverse, and switch operating levers;

Figure 6 is a longitudinal section of the levers of Figure 5 taken on the line 6—6 of Figure 2; and Figure 7 shows the relationship of the throttle of this invention to a powerplant and propeller combination it is designed to control.

As shown on the drawings:

For the sake of clarity, I have chosen to illustrate one of a plurality of throttle controls that may be mounted as a gang on a common axis, it being understood that complete duplicates of the throttle mechanism shown will be used for each of the power plants of a multi-engined airplane. The term "throttle" is used herein to generically refer to the power control of the power plant, including intake throttles on Otto cycle engines, and fuel controls for diesel and turbine engines. In practice, the several throttles will be mounted in a central control stand, and each throttle mechanism will be connected to its respective engine, as by a cable system wherein a pulley 10, operated by the throttle mechanism to be described, moves a cable 11 extending to the engine.

The pulley 10 is pivoted on a fixed shaft 12, and the cable is secured to the pulley to prevent slippage, as by the cable lock of the Richolt Patent No. 2,225,845, which lock has been omitted from the showing herein to avoid drawing complications.

A normal or forward throttle is provided by a lever 13 pivoted at one end on the shaft 12 and having a knob 14 at its free end, this lever acting through a link 15 connected at 16 to the pulley 10 to rotate the latter clockwise as the free or knob end of the lever 13 is moved forward or to the right, in a quadrant 17 on a housing or control stand 18. When the normal throttle lever is so moved to open the engine throttle, the link 15 moves bodily therewith, the left edge of the link seating against a shoulder 19 along the left edge of the lever 13. When the normal or forward throttle lever 13 is being returned from its open position to its idling position the link is held in the position shown by engagement with parts of the reverse throttle and cam to be hereinafter described; so that although the link 15 has no direct connections to the lever 13, it moves as a unit therewith for all forward throttle lever adjustments.

A cam and interlock plate 20 is pivoted at 21 to the lever 13 and disposed between this lever and the link 15. A pair of pins 22 on the cam plate 20 opposite its pivot are so disposed as to normally ride on top of the quadrant 17 when the throttle lever 13 is advanced; and notches 23 are provided in the quadrant at the idle position of the lever 13 to allow the pins 22 to drop therein when the reverse throttle is actuated. It will be evident that with the pins 22 in the notches 23 as shown in Figures 3 and 4 the forward throttle is locked in its idling position. It will also be evident that when the lever 13 is not in its idle position the pins 22 prevent movement of the cam plate 20. The pins 22 also seat under a hook 24 formed on the link 15, to lock the link to the lever 13 for bodily movement therewith.

The upper end of the link 15 is pivoted at 25 to a reverse lever 26, the lever 26 being pivoted in the knob 14 at 27 and terminating in a knob 28. Preferably, the knob 14 is a cylinder and the knob 28 is a sphere in order to distinguish them by touch. The lever 26 is located between the lever 13 and the link 15 for compactness; and in the position of Figure 2, the pivot 25 moves to seat the link 15 against the shoulder 19 on the lever 13, in which position the pivot moves past a centerline drawn between the pivot 27 and the pin 22 thereby locking the link 15 to the lever 13.

The link 15 carries a pin 29 which slides in a tailored groove 30 in the cam plate 20, this groove being so formed adjacent the cam plate pivot 21 that the initial movement of the link 15, in response to movement of the reverse lever 26, tilts the cam plate 20 from the position of Figure 2 to the position of Figure 3. This preliminary tilting or clockwise rotation of the cam plate 20 forces the pins 22 into the notches 23 on the quadrant; and conversely the pins 22 prevent such operation of the reverse lever 26 and link 15 unless the lever 13 is in the idling position.

The cam plate 20 carries a downward extension or trigger 31 which contacts a switch tappet 32 closing a switch 33, which energizes the propeller reversing control (not shown). Also, this preliminary motion merely swings the link 15 about its about its pivot 16 on the pulley 10 and therefore does not act to open the engine throttle.

Continued counterclockwise motion of the reverse lever 26 about its pivot 27 pulls the link 15 upwardly towards the position shown in Figure 4, thus rotating the pulley 10 to open the engine throttle. During this further movement of the link 15 the cam plate 20 remains in the position of Figure 3 as the remaining part of the groove 30 is arranged to match the motion of the pin 29 as determined by the points of attachment of the link 15 to the reverse lever and pulley.

Thus, as the reverse lever 26 is moved from the position of Figure 2 to that of Figure 4, the cam plate is first moved into its switch energizing position while the pulley 10 is stationary, and then the pulley 10 is moved to open the engine throttle while the cam plate 20 is held in its switch engaging position. The converse is also true, in that the reverse throttle lever 26 must be returned to the engine idling position to release the propeller reversing switch 33 before the throttle lever 13 can be moved to accelerate the engine in forward propeller pitch.

Since accidental or inadvertent reversal of one or more propellers while a heavier than aircraft is airborne would have disastrous results, it is necessary in such cases to provide an interlock preventing such reversal until the aircraft is ground or water borne. It is present practice to provide a landing gear downlock to hold the landing gear extended while the airplane is on the ground, i. e. to prevent retraction of the gear until the airplane is airborne. One such downlock now in use involves a switch operated by the full extension of the torque scissors on the landing gear, and a similar arrangement could be used for electric operation of such an interlock. For illustrative purposes a partial closure of the landing gear torque scissors 34, in response to ground contact, is utilized to rotate a downlock lever 35 counterclockwise from the position of Figure 2 to that of Figures 3 and 4. The lever in turn rotates a cam shaft 36, which cam shaft is arranged to prevent the switch closing movement of the tappet 32 in the airborne condition of Figures 1 and 2. Thus the cam shaft 36 forms an interlock which blocks the movement of the cam plate 20, prevents the pins 22 from entering the quadrant slots 23, and by preventing movement of the pin 29 in the groove 30, prevents movement of the reverse lever 26.

It will be evident that the landing gear interlock above described is desirable for heavier than air aircraft, but unnecessary for lighter than air airships, as in the latter case the propeller reversing control can be used to reverse the propellers at will, while preventing such reversal at engine powers and speeds at which the propellers would be overstressed due to overspeeding while the blades are being shifted through their neutral point, at which time the engine is relieved of load.

It will thus be seen that I have provided an improved interlocking throttle and propeller reversing control wherein the throttle control must be moved to neutral or idling before the propeller pitch is reversed, and in which the propeller reversing mechanism is actuated during the initial stages of movement of a separate reverse throttle before the latter begins to accelerate the engine in reverse thrust. A further interlock is provided which is released by ground or water contact, to prevent inadvertent reversal of the propeller while the airplane is airborne.

Having thus described my invention and the present preferred embodiments thereof, I desire to emphasize the fact that many modifications may be resorted to in a manner limited only by a just interpretation of the following claims.

I claim as my invention:

1. An apparatus for controlling an aircraft powerplant having a reversible pitch propeller driven thereby and a throttle controlling the power developed by said powerplant, comprising a first throttle lever to actuate said throttle control for powerplant operation in forward propeller pitch, a second throttle lever pivoted to the first throttle lever to actuate said throttle control for powerplant operation in reverse propeller pitch, a link pivotally connected between said second lever and said throttle control, means for locking said link to said first lever for direct operation of said throttle control, and an interlock between said levers to prevent movement of said second lever when said first lever is displaced from its neutral point and to prevent movement of said first lever when said second lever is displaced from its neutral point.

2. An apparatus for controlling an aircraft powerplant having a reversible pitch propeller driven thereby and a throttle controlling the power developed by said powerplant, comprising means associated with said throttle control to energize the reversible pitch propeller into its reverse pitch position, a first throttle lever to actuate said throttle control for powerplant operation in forward propeller pitch, a second throttle lever pivoted to the first throttle lever to actuate said throttle control for powerplant operation in reverse propeller pitch, a link pivotally connected between said second lever and said throttle control, means for locking said link to said first lever for direct operation of said throttle control, an interlock between said levers to prevent movement of said second lever when said first lever is displaced from its neutral point and to prevent movement of said first lever when said second lever is displaced from its neutral point, and means associated with said interlock to engage said propeller reverse pitch energizing means upon initial movement of said second lever.

3. An apparatus for controlling an aircraft powerplant having a reversible pitch propeller driven thereby and a throttle controlling the power developed by said powerplant, comprising means associated with said throttle control adapted to energize the reversible pitch propeller into its reverse pitch position, a first throttle lever so constructed and arranged as to actuate said throttle control for powerplant operation in forward propeller pitch, a second throttle lever pivoted to the first throttle lever and so constructed and arranged as to actuate said throttle control for powerplant operation in reverse propeller pitch, a link pivotally connected between said second lever and said throttle control, means for locking said link to said first lever for direct operation of said throttle control, an interlock between said levers so constructed and arranged as to prevent movement of said second lever when said first lever is displaced from its neutral point and to prevent movement of said first lever when said second lever is displaced from its neutral point, and a second interlock associated with said propeller reverse pitch means so constructed and arranged as to prevent actuation of said propeller reverse pitch means and said second lever when the aircraft is airborne.

4. An apparatus for controlling an aircraft powerplant having a reversible pitch propeller driven thereby and a throttle controlling the power developed by said powerplant, comprising means associated with said throttle control and so constructed and arranged as to energize the reversible pitch propeller into its reverse pitch position, a first throttle lever so constructed and arranged as to actuate said throttle control for powerplant operation in forward propeller pitch, a second throttle lever pivoted to the first throttle lever and so constructed and arranged as to actuate said throttle control for powerplant operation in reverse propeller pitch, a link pivotally connected between said second lever and said throttle control, means for locking said link to said first lever for direct operation of said throttle control, an interlock between said levers and so constructed and arranged as to prevent movement of said second lever when said first lever is displaced from its neutral point and to prevent movement of said first lever when said second lever is displaced from its neutral point, means associated with said interlock and so constructed and arranged as to energize said propeller reverse pitch means upon initial movement of said second lever, and a second interlock associated with said propeller reverse pitch means and so constructed and arranged as to prevent actuation of said propeller reverse pitch means and said second lever when the aircraft is airborne.

5. An apparatus for controlling an aircraft powerplant having a throttle and a propeller with a pitch reversing mechanism, comprising means for coordinating the throttle control of said powerplant with the pitch reversing control of said propeller including separate throttle levers for accelerating the powerplant in forward and reverse pitch respectively, the throttle lever for reverse pitch having a reverse sensing movement relative to the other lever an interlock interengaging said levers and so constructed and arranged as to prevent simultaneous operation thereof, and means associated with said interlock and so constructed and arranged as to prevent actuation of said reverse throttle lever when the aircraft is airborne.

6. An apparatus for controlling an aircraft powerplant having a throttle and a propeller with a pitch reversing mechanism, comprising means for coordinating the throttle control of said powerplant with the pitch reversing control of said propeller including separate throttle levers for accelerating the powerplant in forward and reverse pitch respectively, the throttle lever for reverse pitch having a reverse sensing movement relative to the other lever an interlock interengaging said levers and so constructed and arranged as to prevent simultaneous operation thereof, means associated with said interlock and so constructed and arranged as to energize the propeller pitch reversing mechanism upon a transfer of the throttle operation to the lever for actuating the powerplant when the propeller is in reverse pitch, and means associated with said interlock and so constructed and arranged as to prevent energization of the propeller pitch reversing mechanism when the airplane is airborne.

7. An apparatus for controlling an aircraft powerplant having a throttle and a propeller with a pitch reversing mechanism, comprising means for coordinating the throttle control of said powerplant with the pitch reversing control of said propeller including separate throttle levers for accelerating the powerplant in forward and reverse pitch respectively, an interlock interengaging said levers and so constructed and arranged as to prevent operation of the reverse throttle lever when the forward throttle lever is advanced, means for locking the forward throttle lever in its neutral position during operation of the reverse throttle lever, and means associated with said interlock and so constructed and arranged as to prevent actuation of said reverse throttle lever when the aircraft is airborne.

8. An apparatus for controlling an aircraft powerplant having a throttle and a propeller with a pitch reversing mechanism, comprising means for coordinating the throttle control of said powerplant with the pitch reversing control of said propeller including separate throttle levers for accelerating the powerplant in forward and reverse pitch respectively, an interlock interengaging said levers and so constructed and arranged as to prevent operation of the reverse throttle lever when the forward throttle lever is advanced, means for locking the forward throttle lever in its neutral position during operation of the reverse throttle lever, means associated with said interlock and so constructed and arranged as to energize the propeller pitch reversing mechanism upon a transfer of the throttle operation to the lever for actuating the powerplant when the propeller is in reverse pitch, and means associated with said interlock and so constructed and arranged as to prevent energization of the propeller pitch reversing mechanism when the airplane is airborne.

9. An apparatus for controlling an aircraft powerplant equipped with a reversible pitch propeller, comprising separate throttle control levers having distinctive movements for controlling the powerplant output in the forward and reverse pitch propeller positions respectively, interlocking means engaging between said separate throttle levers and so constructed and arranged as to prevent the actuation of either lever when the other lever is displaced from its idling position, and means cooperating with said interlocking means and so constructed and arranged as to prevent the operation of said reverse throttle lever when the aircraft is airborne.

10. An apparatus for controlling an aircraft powerplant equipped with a reversible pitch propeller, comprising separate throttle control levers having distinctive movements for controlling the powerplant output in the forward and reverse pitch propeller positions respectively, interlocking means engaging between said separate throttle levers to prevent the actuation of either lever when the other lever is displaced from its idling position, and means operated by said interlocking means to reverse the pitch of said propeller during the initial movement of said reverse throttle lever.

11. An apparatus for controlling an aircraft powerplant equipped with a reversible pitch propeller, comprising separate throttle control levers for controlling the powerplant output in the forward and reverse pitch propeller positions respectively, interlocking means engaging between said separate throttle levers so constructed and arranged as to lock either lever in its neutral position when the other lever is displaced from its idling position, and means cooperating with said interlocking means and so constructed and arranged as to prevent the operation of said reverse throttle lever when the aircraft is airborne.

12. Apparatus for controlling engine power and for effecting the operation of propeller reversing mechanism comprising a throttle lever, a movable member for effecting throttle opening and closing, a pivotal member actuable by said throttle lever, means providing an operative interconnection between said movable member and said pivotal member, means actuable by said pivotal member for operating propeller reversing mechanism, and means operative on said pivotal member to prevent actuation by the pivotal member of the means for operating propeller reversing mechanism.

13. In an airplane, landing gear, a throttle lever, means actuable by said throttle lever to effect throttle opening and closing, means associated with said actuable means and operable thereby for effecting the operation of propeller reversing mechanism, movable means normally operating to prevent said actuable means acting to effect the operation of the propeller reversing mechanism, means for effecting the actuation of said movable member to inoperative position, said latter means being disposed on said landing gear and having an operative connection therewith whereby the landing gear controls the operation thereof so that it cannot effect the actuation of said movable member to inoperative position unless said landing gear is in contact with the ground.

14. In an airplane, landing gear, engine throttle control apparatus operative to actuate propeller reversing mechanism comprising a throttle lever, movable means for effecting throttle opening and closing, means interconnecting said throttle lever and said movable means whereby the former may effect movement of the latter, means controlled by said throttle lever for the operation of propeller reversing mechanism, latch means engageable with said last mentioned means to prevent said throttle lever operating said means for operating propeller reversing mechanism, and means carried by said landing gear for releasing said latch means when said landing gear is in contact with the ground to effect actuation of said latch means to unlatching position to disengage said interconnecting means to permit said throttle lever to be operated to effect actuation of the means for operating propeller reversing mechanism.

ALBERT T. HOLT.

REFERENCES CITED

The following references are of record in the file of this patent:

UNITED STATES PATENTS

| Number | Name | Date |
|---|---|---|
| Re. 15,888 | McCauley | Aug. 5, 1924 |
| 1,427,830 | McCauley | Sept. 5, 1922 |
| 1,455,431 | Dicks | May 15, 1923 |
| 1,693,451 | McCauley et al. | Nov. 27, 1928 |
| 1,694,220 | Jenkins | Dec. 4, 1928 |
| 1,935,620 | Dickey | Nov. 21, 1933 |
| 2,154,887 | Baker | Apr. 18, 1939 |
| 2,179,492 | Caldwell et al. | Nov. 14, 1939 |
| 2,207,042 | Wasseige | July 9, 1940 |
| 2,216,416 | Mader | Oct. 1, 1940 |
| 2,266,784 | Matteucci | Dec. 23, 1941 |
| 2,402,065 | Martin | June 11, 1946 |